United States Patent
Azulay et al.

(10) Patent No.: US 11,283,837 B2
(45) Date of Patent: Mar. 22, 2022

(54) DOMAIN-APPLICATION ATTRIBUTION

(71) Applicant: MICROSOFT TECHNOLOGY LICENSING, LLC, Redmond, WA (US)

(72) Inventors: Itamar Azulay, Mishmar Ayyalon (IL); Idan Gadot, Seattle, WA (US); Amir Geri, Modiin (IL)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 245 days.

(21) Appl. No.: 16/503,031

(22) Filed: Jul. 3, 2019

(65) Prior Publication Data
US 2021/0006595 A1 Jan. 7, 2021

(51) Int. Cl.
*H04L 29/06* (2006.01)
*G06N 7/00* (2006.01)
*H04L 67/10* (2022.01)
*H04L 67/56* (2022.01)

(52) U.S. Cl.
CPC ............ *H04L 63/20* (2013.01); *G06N 7/005* (2013.01); *H04L 63/0281* (2013.01); *H04L 67/10* (2013.01); *H04L 67/28* (2013.01)

(58) Field of Classification Search
CPC ..... H04L 63/20; H04L 63/0281; H04L 67/10; H04L 67/28; G06N 7/005
See application file for complete search history.

(56) References Cited

U.S. PATENT DOCUMENTS

| 8,973,088 | B1* | 3/2015 | Leung | H04L 63/20 726/1 |
|---|---|---|---|---|
| 2005/0120054 | A1* | 6/2005 | Shulman | G06F 21/577 |
| 2014/0089174 | A1* | 3/2014 | Carapelli | G07G 1/0009 705/39 |
| 2015/0074751 | A1 | 3/2015 | Agarwal et al. | |
| 2016/0036857 | A1 | 2/2016 | Foxhoven et al. | |
| 2017/0332238 | A1* | 11/2017 | Bansal | H04L 67/02 |
| 2018/0295134 | A1 | 10/2018 | Gupta et al. | |
| 2020/0412726 | A1* | 12/2020 | Nevatia | G06F 21/554 |

OTHER PUBLICATIONS

"International Search Report and Written Opinion Issued in PCT Application No. PCT/US20/032413", dated Jul. 28, 2020, 11 Pages.

\* cited by examiner

*Primary Examiner* — Padma Mundur

(57) ABSTRACT

A domain is automatically attributed to a cloud application hosted on a cloud service. The attribution of a domain with a cloud application is used to initiate session policies that protect the cloud applications. A security session monitors the operations performed by a user with a cloud application and applies session policies that are pre-configured automated actions used to protect a particular cloud application, such as blocking downloads, blocking modifications, etc.

20 Claims, 4 Drawing Sheets

DOMAIN-APPLICATION ATTRIBUTION

BACKGROUND

The proliferation of the Internet has changed the workplace. An organization's Information Technology (IT) resources may be hosted on a cloud service which enables access from any location, from different types of applications (e.g., web-based application, mobile application, desktop application) and from different types of devices (e.g., mobile, Internet of Things (IoT), desktop, laptop, etc.). The cloud service provides increased productivity to the workplace since users can access the resources from anywhere and at any time. However, this increased productivity and flexibility increases the complexity of the security needed to protect the network resources. Merely authenticating a user's login credentials is not sufficient to protect access to the network resources. Security concerns may be raised if access is requested from a location not under the control of an organization's IT department, an access attempt is requested through an application type that is known to be suspect, or from devices that are blocked by the organization. Hence, there needs to be a balance between the security to protect resources provided by a cloud service and the productivity of the users of the cloud service.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A domain is automatically attributed with a cloud resource (e.g., application, library, device, service, etc.) by a proxy server in order to initiate session policies targeted to protect a cloud resource in an intended manner. The proxy server interfaces between the user and the cloud service hosting the cloud resource. The proxy server includes a security module that monitors the operations performed by a user during a user session with the cloud resource. The security module establishes a security session to apply session policies to protect a particular cloud resource. The session policies are pre-configured automated actions, such as blocking downloads, blocking modifications, etc.

The proxy server automatically associates a domain name with an appropriate cloud resource when the domain has not been previously attributed with a cloud resource. The proxy server compares features of domains attributed to a cloud resource with features of the unattributed domain. The proxy server utilizes statistical techniques to perform the comparison and determines the most likely cloud resource to attribute to an unattributed domain. The proxy server may then apply the appropriate session policies to protect the cloud resource.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

The subject matter pertains to the attribution of a domain with a cloud resource. In one aspect, the attribution of a domain with a cloud resouce is used to initiate actions to protect the cloud resource. A proxy server interfaces between the user and the cloud service hosting the resource. The proxy server includes a security module that establishes a security session with the cloud service that hosts the resource. The security module monitors the operations performed by a user during a user session with the resources hosted by the cloud service. The security module applies session policies that are pre-configured automated actions used to protect a particular cloud resource, such as blocking downloads, blocking modifications, etc.

The proxy server receives the network traffic destined for the cloud service. The proxy server associates or attributes a domain name with a particular cloud resource in order to service an access request. Each domain name is attributed to a single cloud resource. The proxy server keeps a log of domains and their attributed resource. At times, a request may be encountered with a domain name that is not associated or attributed with a cloud resource. In this case, the security module cannot protect the target cloud resource and trigger the session policies that may be warranted to protect the cloud resource. Without the real-time session monitoring utilizing the appropriate session policies for a cloud resource, the cloud resource is unprotected from data theft and data loss.

In one aspect, the cloud resource is a cloud application, such as a software program (executable code, intermediate language code, source code, library, component, etc.) However, the disclosure is not limited to a cloud application and may be applied to any type of network-accessible resource.

The disclosure presented herein provides a technique for automatically associating or attributing a domain with a cloud application based on the similarity of the features of an unattributed domain with the features of known domains attributed with a particular cloud application. In this manner, session policies are applied to a cloud application during the session monitoring so that the cloud application is protected as intended.

Attention now turns to a further discussion of the system, devices, components, and methods utilized in a code completion system.

System

Figure 1:
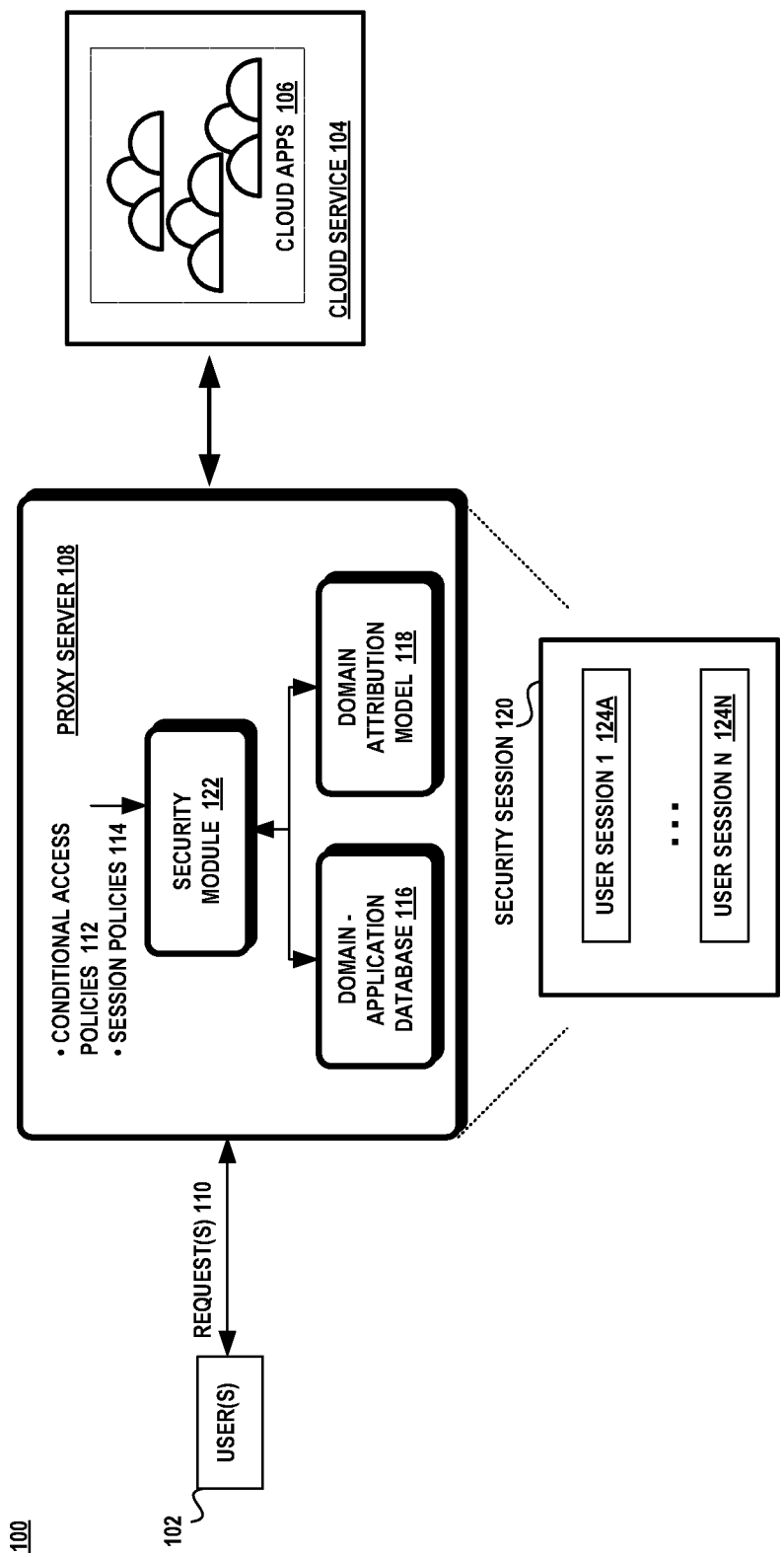
FIG. 1 illustrates an exemplary system for automatically attributing a domain with a cloud resource.

FIG. 1 illustrates a block diagram of an exemplary system 100 in which various aspects of the invention may be practiced. As shown in FIG. 1, the system 100 includes one or more users 102 communicatively coupled to a cloud service 104 that hosts one or more cloud applications 106 through a proxy server 108. The cloud service 104 may include an identity provider that authenticates a user's access to a cloud application 106. The cloud service 104 may include other services with respect to the cloud applications 106.

The proxy server 108 is an intermediary device situated between a user's computing device 102 and the cloud service 104 that blocks direct access between two networks. The proxy server 108 works by intercepting the network traffic between a sender and receiver. All incoming data enters through one port and is forwarded to the rest of the network via another port. In this manner, it is much more difficult for hackers to get internal addresses and details of a private network.

In one aspect, the proxy server 108 operates as a reverse proxy. A reverse proxy provides access to Internet resources that are behind a firewall and is used by the cloud service 104. However, it should be noted that the proxy server 108 may also be utilized as a forward proxy which operates on the client device, such as by a web browser.

The proxy server 108 includes a security module 122 that performs various security functions. An organization whose cloud applications are hosted on the cloud service 104 may provide instructions in the form of policies that are used by the security module 122 to manage access of an organization's cloud applications. Conditional access policies 112 are set by an organization to facilitate automated access control decisions. The security module 122 uses the conditional access policies 112 to permit access to a resource based on conditions set by the organization. Conditional access policies 112 may take into consideration the type of device seeking access, the location from which the access request is generated, the type of application used to perform an access request, and/or the sign-in risk level. A conditional access policy is a definition of one or more conditions under which access is automatically assigned or denied to a cloud application.

The security module 122 uses session policies 114 to automate operations during real-time session monitoring. A session refers to a temporary and interactive exchange of information between multiple devices, such as between a user 102 and a cloud application 106. The session policies 112 are instructions that facilitate automated control over user actions during a session. Exemplary session policies may include monitoring activities performed by a user during a session, blocking downloads, blocking specific activities and protecting files on a download operation. For example, a session policy may allow a user limited access to a cloud application, instead of allowing access completely or blocking access completely, when the session is monitored.

The security module 122 implements the conditional access policies 112 and session policies 114. When a request is made by a user 102 to access a cloud application hosted by the cloud service, the request 110 is routed to the security module 122. The security module 122 sets up a single security session 120 for the user. The security session 120 exists while the user is engaging with any of the cloud applications 106 during any of the user sessions 124A-124N. The security session 120 is used to monitor the user actions for compliance with the policies configured for a cloud application.

In one aspect, the security module 122 receives requests 110 from users 102 to access a cloud application 106. In one aspect, the request 110 is an HyperText Transfer Protocol (HTTP) request. The HTTP request 110 includes a Uniform Resource Locator (URL) having a domain name. The domain name is an identifier of an authority on the Internet and identifies one or more IP addresses. The security module 122 logs the domains that are associated or attributed with a particular application in order to facilitate the session monitoring in a domain/application database 116. The combination of the domain name and the attributed cloud application is used to access the target cloud application and to invoke the appropriate security policies. The domain/application database 116 contains an entry for each domain name that is used to access a particular cloud application 106. When a new domain name is encountered in an HTTP request that is not logged in the domain/application database 116, the security module cannot apply the session policies for the target cloud application. Hence, a mechanism is needed to associate or attribute the appropriate cloud application 106 with the new domain name in order to apply the appropriate session policies.

The security module 122 uses a domain attribution model 118 to determine the most likely cloud application to associate with an unknown or unattributed domain. The domain attribution model 118 uses statistical techniques to determine the most likely cloud application to attribute to the new domain name. The statistically techniques are based on a similarity between the features of the unknown domain with the features of the domains attributed with cloud applications. A similarity is based on probabilities and the cloud application attributed to the domain having the highest probability is attributed to the unknown domain.

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention. For example, this disclosure is not limited to cloud applications and may be practiced with any resource capable of being accessible through a network, such as without limitations, devices, Methods.

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 2:
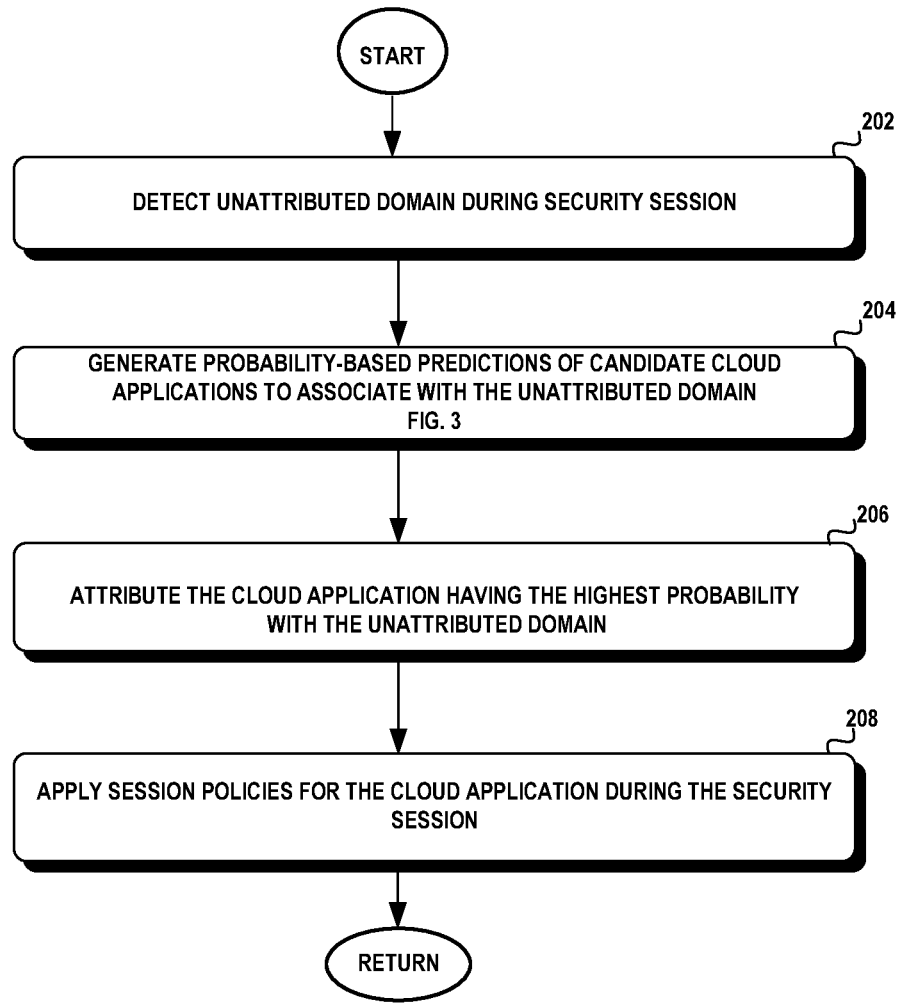
FIG. 2 is a flow diagram illustrating an exemplary method for applying session policies to an attributed cloud resource.

FIG. 2 illustrates an exemplary method 200 for attributing or associating a cloud application with a domain Referring to FIGS. 1 and 2, as a user 102 initiates a user session with the cloud service 104 hosting a target cloud application 106, a security session 120 is initiated by the security module 122. The security session 120 is utilized to track the user actions during each user session 124 that the user 102 initiates with the cloud service 104. A user 102 requests access to a cloud application by initiating an HTTP request 110 that includes a domain name. The security module 122 utilizes the domain-application database 116 to determine the appropriate cloud application for the request. Each domain name is associated with a single cloud application.

In the event, a new domain name is referenced in the HTTP request 110, there is no entry for the new domain name in the domain-application database 116. The security module 122 has to associate a cloud application 106 with this new domain name in order to implement the appropriate session policies 114. (Collectively, block 202).

The security module 122 determines the appropriate cloud application through application of a domain attribution model 118. The domain attribution model 118 is based on statistical techniques that predict the likelihood of the unattributed domain name being associated with a particular cloud application through a comparison of the features of domains attributed with a cloud application with the features of the unattributed domain (Collectively, block 204).

The probabilities generated from the domain attribution model are analyzed by the security module 122. The cloud application 106 having the highest probability is selected to attribute to the unknown domain (block 206). The security module 122 then applies the session policies 114 associated with the attributed cloud application (block 208). These steps are repeated for each new domain name that is encountered by the proxy server 108 (blocks 202-208).

Figure 3:
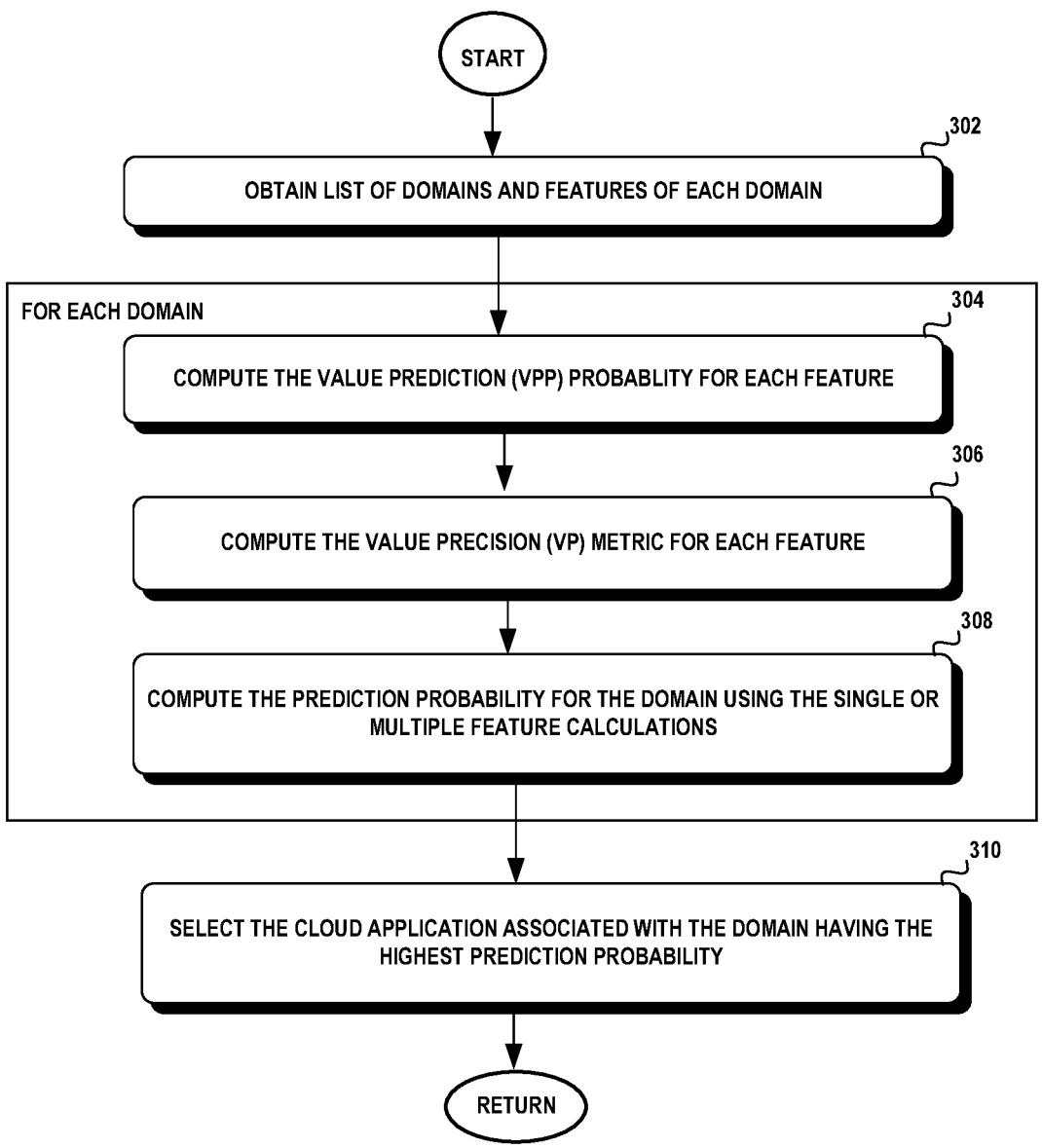
FIG. 3 is a flow diagram illustrating an exemplary method for determining the most probable cloud resource to attribute to a domain based on a statistical comparison of features of multiple domains.

Turning to FIG. 3, there is shown an exemplary method for generating the probabilities used to determine the most likely cloud application being associated with a particular domain. The method starts with obtaining a list of domain names Exemplary domain names are microsoft.com, ibm.com, google.com, wikipedia.com, etc. The list of domain names may be obtained from a Domain Name System server (DNS) and/or InterNIC databases. In one aspect, the list of domain names may be those that are accessed by the users of a particular organization that utilizes the cloud services. These domain names may be detected at the organization's firewall or gateway (Collectively, block 302).

Features associated with a domain are extracted for each domain in the domain list. A feature is a characteristic of a domain that uniquely describes the domain such as without limitation, one or more IP addresses, one or more email addresses, an organization name, a mailing address, a phone number, a fax number, etc. These features may be obtained from the DNS record associated with a domain's registration. In addition, the Secure Socket Layer/406677-US-NP Transport Layer Security (SSL/TLS) certificate used to establish an initial communication setup with the proxy server, contains a common name (CN) which is the fully qualified domain name of a web server. The common name is also a feature of a domain. (Collectively, block 302).

In addition, the features may include other domains that are related to a domain. The relationship may be determined from a SSL/TLS certificate which may include additional domain names. Also, a URL redirection or HTTP redirects, is a response to a HTTP request that redirects the request to a new URL which contains another domain name. This new domain name is considered a feature of the original domain name (Collectively, block 302).

Each feature contains a value. For example, the value of the feature, organization name, is Microsoft Corporation for the domain name, microsoft.com. When the feature is a name server, a value may be NS1: UNIREGISTRY-DNS.COM, NS2: UNIREGISTRY—DNS.COM or NS-1187: AWSDNS20.ORG. (Collectively, block 302).

The prediction probability is calculated for each domain based on a comparison of the value of the features of the attributed domains with the values of the features of the unattributed domain. The attributed domain having the highest prediction probability is selected and the cloud application attributed to that attributed domain is attributed to the unknown domain. The comparison uses a domain attribution model that computes the prediction probability of each attributed domain using the following computations.

The value prediction probability, VPP, is the probability that a specific value of a specific feature is associated with a specific cloud application. For example, for the value, "cmo-software.com", of feature, common name, the value prediction probability measures how likely the use of this value will result in an accurate prediction of a cloud application for a given domain name. The VPP is computed as the ratio of the number of times an attributed domain associated with this specific cloud application matches a value of a feature with the unknown domain over the number of times the value of a feature of the unknown domain matches the value of a feature of any domain that has been attributed to any known cloud application The value precision metric, VP, is the probability that a specific value of a feature is a good attribution measure. The VP is the reciprocal of the number of times a cloud application is associated with a domain having a value of a feature that matches the value of that same feature in the unattributed domain. The value precision metric is a weight that weighs commonly-used features less and less-used features more.

The value prediction probability and the value precision metric are then used to determine the probability that the cloud application is more likely to be attributed to the unknown domain. Although a domain is associated with a single application, an application may be attributed to multiple domains. The comparison of the values of the features of each domain is used to determine the most likely cloud application based on its association with a domain having the closest matching feature values.

The prediction probability formula is represented mathematically as follows:

Let a be a cloud application and A is the set of cloud applications, a∈A, f is a feature of a domain and F is the set of features in the set of domains, f∈F, n is the number of features in the set of features F, d is an unattributed domain, D(a) is the list of domains attributed to cloud application a, d∉D, $\hat{d}$ is an attributed domain, V(f, d) is the value of feature f for unattributed domain d, and V(f, $\hat{d}$) is the value of feature f for an attributed domain $\hat{d}$.

The value prediction probability, VPP(a, V(f, d)), is the probability of a specific value of a feature f of unattributed domain d to denote attribution to cloud application a. This probability is based on n(f, d, a) and C(f, d). The computation n(f, d, a) represents the number of times a value of a feature of the unattributed domain d matches the value of the feature f of an attributed domain $\hat{d}$ that is attributed to cloud application a. The computation C(f, d) represents the number of times a value for a feature of the unattributed domain d matches a value for the feature in any attributed domain. The value prediction probability is the ratio of the number of times a value of a feature of an unattributed domain d matches the value of a feature of an attributed domain $\hat{d}$ over the number of times the feature of the unattributed domain matches the feature in the attributed domains. The value prediction probability is represented mathematically as follows:

$$VPP(a, V(f, d)) = \frac{n(f, d, a)}{C(f, d)}, \tag{1}$$

where $n(f, d, a) = \#(\hat{d} \in D(a): V(f, \hat{d}) = V(f, d)), \forall f \in F, a \in A,$ (2)

$$C(f, d) = \#(\hat{d}: V(f, \hat{d}) = V(f, d)). \tag{3}$$

The value precision, VP, measures the accuracy of a specific value of a feature to attribute an application to the unattributed domain. It is a weight that is used to weigh less-commonly used or unique features more than commonly-used features. The value precision is based on T(f, d). T(f, d) represents the number of applications that are attributed to domains that have the same value of a feature found in the unattributed domain. Common features are weighed less and the less-frequently used features are weighted more by using the reciprocal of T(f, d). The value precision, VP, is represented mathematically as follows:

$$VP(V(f, d)) = \frac{1}{T(f, d)}, \quad (4)$$

$$\text{where } T(f, d) = \#\{a \in A: \exists \hat{d} \in D(a): V(f, \hat{d}) = V(f, d)\}. \quad (5)$$

The unattributed domain $\hat{d}$ is attributed to the cloud application associated with a domain that closely matches the features of an unattributed domain. The computation that determines how closely the features of one domain matches another is the prediction probability P. The prediction probability may be based on a single feature or on multiple features.

A feature probability, FP(f, d, a), represents the probability of the unattributed domain d being attributed to cloud application a based on a similarity of a single feature f. The feature probability FP(f, d, a) is the product of the value prediction probability, VPP (a, V(f,d)), and the value precision VP(V(f, d)) for unattributed domain d, cloud application a, and feature f. The feature probability is normalized within the range [0,1] using the normalizing factor, N(f, d) as follows:

$$N(f, d) = \begin{cases} 1, & T(f, d) \leq 1, \\ 2, & T(f, d) > 1 \end{cases} \quad (6)$$

Hence, the feature probability FP(f, d, a) may be represented mathematically as follows:

$$FP(f,d,a) = VPP(a, V(f,d)) * VP(V(f,d)) * N(f,d) \quad (7)$$

In the case, where n features are used in the comparison, the computation becomes the following:

$$P(\hat{d}) = 1 - \Pi_{i=1}^{n}(1 - VPP(a, V(f_i, d)) * VP(V(f_i, d)) * N(f_i, d)) \quad (8)$$

The cloud application that is attributed to the unattributed domain d is the cloud application a that is attributed with domain $\hat{d}$ having the largest value of P.

Turning back to FIG. 3, for each domain, the value prediction probability, VPP, is computed as in equations (1)-(3) above (block 304) and the value precision metric, VP, is computed as in equations (4)-(5) (block 306). For each domain, the prediction probability for the attributed domain is then determined in accordance with equations (6)-(8) (block 308). The domain having the highest prediction probability is selected and the cloud application attributed to this domain is determined to be the cloud application that will be attributed to the unattributed domain (block 310).

Exemplary Operating Environment

Figure 4:
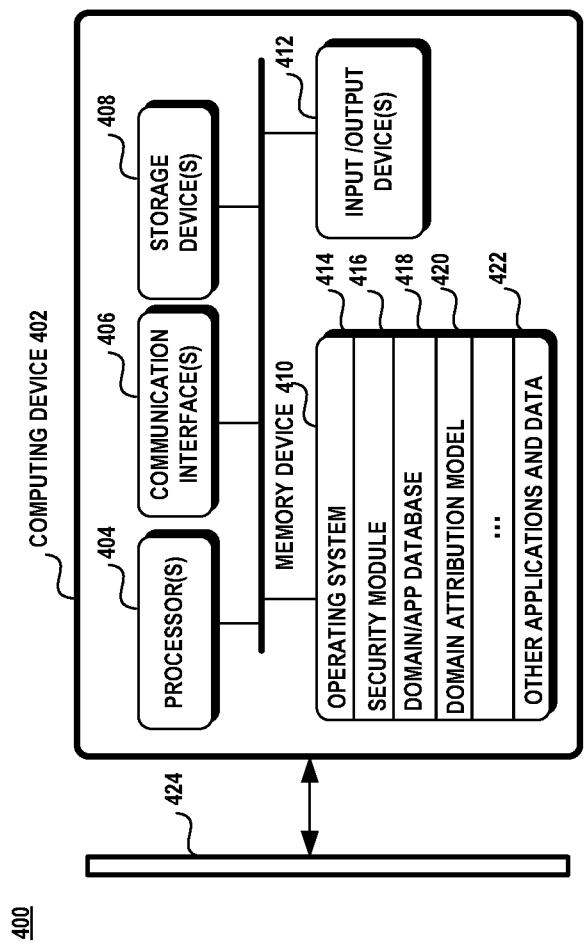
FIG. 4 is a block diagram illustrating an exemplary operating environment.

Attention now turns to a discussion of an exemplary operating environment. FIG. 4 illustrates an exemplary operating environment 400 in which one or more computing devices 402 are used to perform the attribution of a domain to a cloud application. However, it should be noted that the aspects disclosed herein is not constrained to any particular configuration of devices. Computing devices 402 may be configured as a cloud service that perform the security services for the cloud applications. It should be noted that the operating environment is not limited to any particular configuration and other configurations are possible.

A computing devices 402 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 400 may be configured in a network environment, a distributed environment, a multi-processor environment, or a stand-alone computing device having access to remote or local storage devices.

The computing device 402 may include one or more processors 404, one or more communication interfaces 406 one or more storage devices 408, one or more input/output devices 412, and a memory device 410. A processor 404 may be any commercially available or customized processor and may include dual microprocessors and multi-processor architectures. The communication interface 406 facilitates wired or wireless communications between the computing device 402 and other devices. A storage device 408 may be computer-readable medium that does not contain propagating signals, such as modulated data signals transmitted through a carrier wave. Examples of a storage device 408 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 408 in the computing device 402. The input/output devices 412 may include a keyboard, mouse, pen, voice input device, touch input device, display, speakers, printers, etc., and any combination thereof.

A memory 410 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 410 may also include one or more external storage devices or remotely located storage devices that do not pertain to propagated signals, such as modulated data signals transmitted through a carrier wave. The memory 410 may include an operating system 414, a security module 416, a domain/application database 418, a domain attribution model 420, and other applications and data 422.

The computing device 402 may be communicatively coupled to a network 424. The network 424 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 424 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Conclusion

A system is disclosed having one or more processors and a memory. The system also includes one or more programs. The one or more programs are stored in the memory and configured to be executed by the one or more processors, the one or more programs including instructions that: utilize a proxy server to initiate a security session that monitors user access to one or more cloud resources, wherein the proxy server relies on a domain being attributed with a particular cloud resource; detect a request from a first domain that is not attributed to a cloud resource; attribute the first domain to a cloud resource attributed to a second domain, wherein the attribution is based on similarity of at least one value of a feature in the first domain matching at least one value of the feature in the second domain; and apply at least one security policy to the attributed cloud resource of the first domain during the security session.

In one or more aspects, the one or more programs include further instructions that when executed by the one or more processors perform actions that: generate a value prediction probability for the first domain based on a comparison of a specific value of a feature of the second domain with a specific value of the feature of the first domain.

In one or more aspects, the one or more programs include further instructions that when executed by the one or more processors perform actions that: generate a value precision metric for the second domain that weighs a less-frequently used feature over a commonly-used feature.

In one or more aspects, the one or more programs include further instructions that when executed by the one or more processors perform actions that: compute a probability of the second domain being associated with a particular resource to attribute to the first domain based on the value prediction probability for the second domain and the value precision metric for the second domain.

In one or more aspects, the one or more programs include further instructions that when executed by the one or more processors perform actions that: determine the attribution of the first domain to the cloud application attributed to the second domain based on a comparison of a plurality of features from a plurality of domains.

In one or more aspects, the one or more programs include further instructions that when executed by the one or more processors perform actions that: compute a prediction probability for each of the plurality of attributed domains as a product of feature probabilities associated with each domain, wherein a feature probability is based on a value prediction probability of an attributed domain and a value precision metric of an attributed domain.

In one or more aspects, the cloud resource is a cloud application and the proxy server is a reverse proxy.

A method is disclosed comprising attributing at a proxy server, a new domain with a cloud resource hosted on a cloud service, wherein the proxy server interfaces between the cloud service and a network that receives requests to access cloud resources hosted on the cloud service. The attribution comprises: obtaining a plurality of attributed domains associated with the cloud service, an attributed domain having one or more features, a feature having at least one value; obtaining a plurality of features of the plurality of attributed domains; comparing a value of each feature of the plurality of attributed domains with a value of each feature of the new domain; attributing the new domain with a select cloud resource attributed to a select attributed domain having closest matching values of features of the new domain; and applying a security function associated with the select cloud resource.

In one or more aspects, the method further comprises: determining, for each attributed domain, a value prediction probability; computing, for each attributed domain, a value precision metric; and generating, for each attributed domain, a feature probability based on the value prediction probability and the value precision metric.

In one or more aspects, the method further comprises: selecting the attributed domain having a highest feature probability; and attributing the new domain with a cloud resource attributed with the attributed domain having the highest feature probability.

In one or more aspects, the method further comprises: computing the highest feature probability based on a comparison of a value of one feature.

In one or more aspects, the method further comprises: computing the highest feature probability based on a comparison of a value of multiple features.

In one or more aspects, the method further comprises: obtaining the plurality of features of the plurality of attributed domains from a domain name server, InterNIC database, a Secure Socket Layer/Transport Layer Security SSL/TLS certificate, and/or HyperText Transfer Protocol (HTTP) redirects. In one or more aspects, the proxy server is a reverse proxy.

A device is disclosed having at least one processor and at least one memory device. The at least one processor is configured to: initiate a security session that monitors user access to one or more cloud resources, wherein the security session implements one or more security policies for a domain attributed to a particular cloud resource; detect a request including a first domain that is not attributed to a cloud resource; attribute the first domain to a cloud resource attributed to a second domain, wherein the attribution is based on similarity of at least one value of a feature in the first domain matching at least one value of the feature in the second domain; and apply at least one security policy to the attributed cloud resource of the first domain during the security session.

In one or more aspects, the at least one processor is further configured to: compute a probability of the second domain having at least one value of a feature matching at least one value of the feature matching the first domain utilizing a feature probability, wherein the feature probability represents the probability of the first being attributed to cloud application resource attributed to the second domain based on a similarity of the at least one value of a common feature.

In one or more aspects, the feature probability is a product of a value prediction probability and a value precision for each feature of each attributed domain associated with the cloud service. In one or more aspects, the device is a forward proxy server. In one or more aspects, the device is a reverse proxy server.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   one or more processors; and a memory;
   one or more programs, wherein the one or more programs are stored in the memory and configured to be executed by the one or more processors, the one or more programs including instructions that when executed perform acts that:
   utilize a proxy server to initiate a security session that monitors user access to a first cloud resource;
   track, at the proxy server, attribution of a domain name with a respective cloud resource in a database, wherein the database includes the attributed domain name with the respective cloud resource;
   detect a request, at the proxy server, wherein the request pertains to a first domain name and a first cloud resource;
   determine that the first domain name is not found in the database;
   attribute the first domain name to a second cloud resource attributed to a second domain name, wherein the attribution is based on similarity of at least one value of a feature of the first domain name matching at least one value of the feature of the second domain name; and
   apply the at least one security policy of the second domain name to the first cloud resource during the security session.

2. The system of claim 1, wherein the one or more programs include further instructions that when executed by the one or more processors perform actions that:
   generate a value prediction probability for the first domain name based on a comparison of a specific value of the feature of the second domain name with a specific value of the feature of the first domain name.

3. The system of claim 2, wherein the one or more programs include further instructions that when executed by the one or more processors perform actions that:
   generate a value precision metric for the second domain name that weighs a less-frequently used feature over a commonly-used feature.

4. The system of claim 3, wherein the one or more programs include further instructions that when executed by the one or more processors perform actions that:
   compute a probability of the second domain name being associated with the second cloud resource to attribute to the first domain name based on the value prediction probability for the second domain name and the value precision metric for the second domain name.

5. The system of claim 4, wherein the one or more programs include further instructions that when executed by the one or more processors perform actions that:
   determine the attribution of the first domain name to the second cloud resource attributed to the second domain name based on a comparison of a plurality of features from a plurality of attributed domains.

6. The system of claim 5, wherein the one or more programs include further instructions that when executed by the one or more processors perform actions that:
   compute a prediction probability for each of the plurality of attributed domains as a product of feature probabilities associated with each domain, wherein a feature probability is based on a value prediction probability of an attributed domain and a value precision metric of an attributed domain.

7. The system of claim 1, wherein the cloud resource is a cloud application.

8. The system of claim 1, wherein the proxy server is a reverse proxy.

9. A method performed in a proxy server having a processor and a memory, the method comprising:
   initiating a security session to monitor interactions between a user and a first cloud resource of a cloud service;
   intercepting a request for access to the first cloud resource, wherein the request includes a first domain name;
   searching in a database for the first domain name, wherein the database maps a domain name to an attributed cloud resource of the cloud service;
   detecting that the first domain name is not present in the database;
   attributing the first domain name to a second cloud resource attributed to a second domain name, wherein the attribution is based on similarity of at least one value of a feature in the first domain matching at least one value of the feature in the second domain; and
   applying a security policy of the second domain name to the first cloud resource during the security session.

10. The method of claim 9, further comprising:
    generating a value prediction probability for the first domain name based on a comparison of a specific value of the feature of the second domain name with a specific value of the feature of the first domain name.

11. The method of claim 9, further comprising:
    generating a value precision metric for the second domain name that weighs a less-frequently used feature over a commonly-used feature.

12. The method of claim 11, further comprising:
    computing a probability of the second domain name to the first domain name based on the value prediction probability for the second domain name and the value precision metric for the second domain name.

13. The method of claim 12, further comprising:
    determining the attribution of the first domain name to the second cloud resource based on a comparison of a plurality of features from a plurality of attributed domains.

14. The method of claim 13, further comprising:
    computing a prediction probability for each of the plurality of attributed domains as a product of feature probabilities associated with each attributed domain, wherein a feature probability is based on a value prediction probability of an attributed domain and a value precision metric of an attributed domain.

15. The method of claim 9, wherein the cloud resource is a cloud application.

16. The method of claim 9, wherein the proxy server is a reverse proxy.

17. The method of claim 9, wherein the method further comprises:
    updating the database with the first domain name and the attributed second cloud resource.

18. A proxy server, comprising:
    a processor and a memory;
    wherein the processor is configured to perform actions that:
    maintain a domain attribution database that maps a domain name with an attributed cloud resource of a cloud service;
    initiate a security session to apply a security policy to the first cloud resource;
    detect a request for the first cloud resource, the request including a first domain name;
    determine, from the domain attribution database, that no attribution exists for the first domain name;
    access a domain-attribution model to determine a similar cloud application of a second domain name to associate with the first domain name, wherein the domain-attribution model determines the similar cloud application based on similarity in one or more features of the first domain name with one or more features of attributed domain names; and
    apply a security policy of the second domain name to the first cloud resource.

19. The proxy server of claim 18, wherein the security policy includes monitoring activities performed during the security session, blocking downloads, blocking one or more activities performed during the security session, or protecting downloaded data.

20. The proxy server of claim 18, wherein the processor is configured to perform actions that:
    implement a conditional access policy of the similar cloud application to the first domain name.

* * * * *